United States Patent [19]

Haraguchi et al.

[11] Patent Number: 4,827,296
[45] Date of Patent: May 2, 1989

[54] SINGLE-LENS REFLEX CAMERA

[75] Inventors: Shosuke Haraguchi; Hidehiko Fukahori; Masanori Ishikawa, all of Kanagawa, Japan

[73] Assignee: Canon Kabushiki Kaisha, Tokyo, Japan

[21] Appl. No.: 240,420

[22] Filed: Sep. 1, 1988

Related U.S. Application Data

[63] Continuation of Ser. No. 926,136, Nov. 3, 1986, abandoned.

[30] Foreign Application Priority Data

Nov. 8, 1985 [JP] Japan .................................. 60-248911

[51] Int. Cl.$^4$ ..................... G03B 3/10; G03B 5/00; G03B 17/04
[52] U.S. Cl. ............................. 354/187; 354/195.12
[58] Field of Search .................. 354/400, 187, 195.1, 354/195.12; 350/429, 255

[56] References Cited

U.S. PATENT DOCUMENTS

| | | | |
|---|---|---|---|
| 4,348,089 | 9/1982 | Shenk | 354/195.1 X |
| 4,525,050 | 6/1985 | Ohashi | 354/195.12 |
| 4,643,555 | 2/1987 | Wakayashi | 354/195.12 X |
| 4,721,972 | 1/1988 | Wakabayashi | 354/195.1 |
| 4,779,964 | 10/1988 | Ozawa et al. | 354/187 X |

Primary Examiner—W. B. Perkey
Attorney, Agent, or Firm—Fitzpatrick, Cella, Harper & Scinto

[57] ABSTRACT

A single-lens reflex camera having a motor-driven focusing device comprises a switch arranged to be controlled by an external operating member which is provided for turning off a power supply; and motor control means arranged to drive, in association with the switch, the motor-driven focusing device to shift its position to a given position where a photo-taking lens is at its minimum length. The camera, therefore, can be carried in a compact state for improved portability. The camera case also can be compactly arranged.

5 Claims, 9 Drawing Sheets

SINGLE-LENS REFLEX CAMERA

This application is a continuation of application Ser. No. 926,136, now abandoned, filed Nov. 3, 1986.

BACKGROUND OF THE INVENTION

1. Field of the Invention

This invention relates to a camera and more particularly to a camera incorporating a motor-driven focusing device and a motor-driven zooming device.

2. Description of the Related Art

Heretofore, the single-lens reflex cameras have greatly contributed to enlargement of the photographable range of the cameras by the use of photo-taking lenses of varied focal lengths as cameras of this type are generally arranged to permit use of interchangeable lenses. Meanwhile, however, for general photographers, a normally desirable photographing range can be covered by a zoom lens of, for example, three magnifications having variable focal lengths from 35 to 105 mm. However, the sizes of the single-lens reflex cameras of this kind have come to increase their sizes in general because of the recent tendency of including automatic motor-driven devices for film winding, film rewinding, automatic lens focusing, etc. As a result, it has been extremely difficult to improve the portability of these cameras which excel in optical performance.

SUMMARY OF THE INVENTION

It is an object of this invention to provide a single-lens reflex camera which solves the above-stated problem of the prior art and can be compactly arranged while retaining the optical characteristics of the photo-taking lens thereof at a sufficiently high grade.

The above and other objects and features of the invention will become apparent from the following detailed description of embodiments thereof taken in connection with the accompanying drawings.

BRIEF DESCRIPTION OF THE DRAWINGS

FIG. 12 is a diagram schematically showing the flow of operation which takes place within the control circuit when the power supply is switched on.

DETAILED DESCRIPTION OF THE PREFERRED EMBODIMENT

Figure 1:
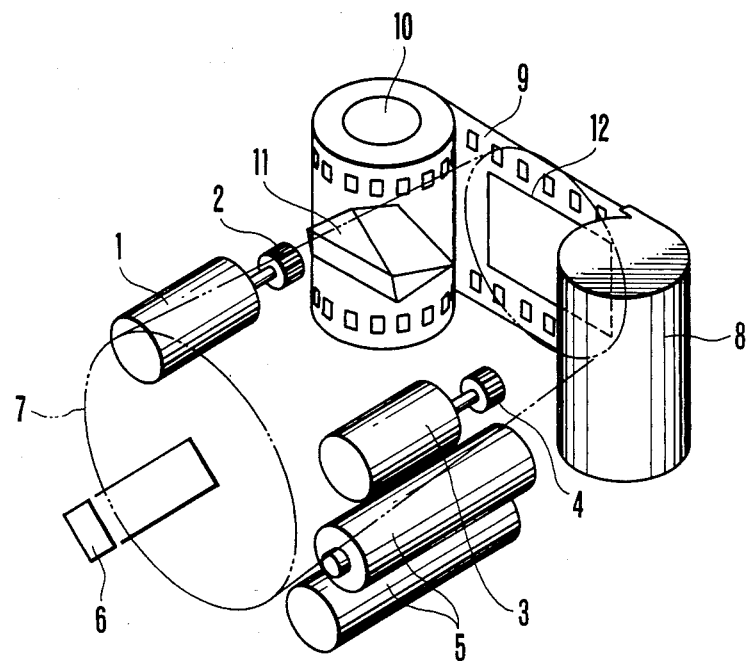
FIG. 1 is a perspective view showing in outline the arrangement of a single-lens reflex camera embodying this invention.
Figure 2:
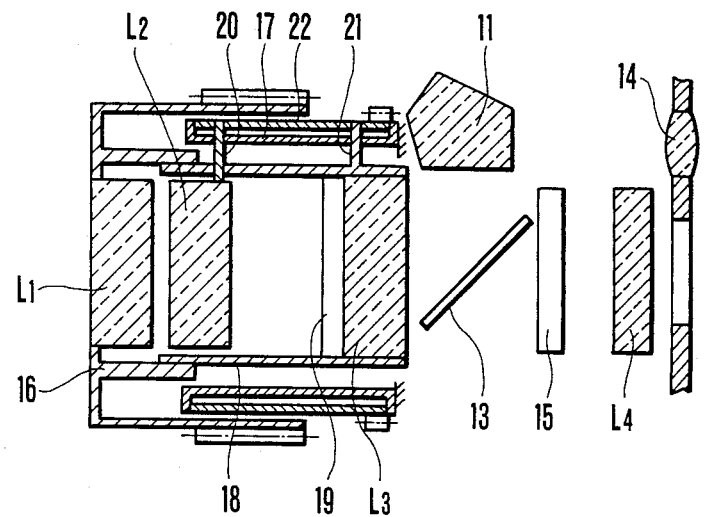
FIG. 2 is a section view of the same embodiment.

A preferred embodiment of this invention is arranged as described below with reference to FIGS. 1 through 12:

Referring first to FIGS. 1 and 2, the outline of an arrangement of a single-lens reflex camera embodying this invention as the embodiment thereof is as follows: A zoom lens barrel 7 is undetachably secured to a camera body which is not shown. Round the lens barrel 7 are disposed a first motor 1 which is provided with a transmission gear 2; and a second motor 3 which is provided with a transmission gear 4. Power source batteries 5 and a light receiving part 6 for automatic focusing distance measurement are disposed closer to an object to be photographed than chambers provided in the camera body for containing therein a film cartridge 8 and a spool 10. A half-mirror 13 which is included in a view finder system is secured to and disposed within the camera body. The view finder system further includes a pentagonal prism 11 and an eyepiece 14. A photo-taking system of the camera includes lens groups L1, L2 and L3; the above-stated half-mirror 13 disposed within the camera body; a shutter device 15; a fourth lens group L4; an aperture 12 and film 9. The zoom lens barrel 7 is provided with a focusing tube 16 which is arranged to carry the first lens group L1; a fixed tube 17; a carrying tube 18 which is arranged to have the second lens group L2 fitted therein and to carry a stop 19 and the third lens group L3; and a zoom tube 22. The lens groups L1 to L3 and the lens group L4 which is disposed within the camera body jointly form a zoom lens system of three magnifications having a variable focal length between 35 and 105 mm.

Figure 3:
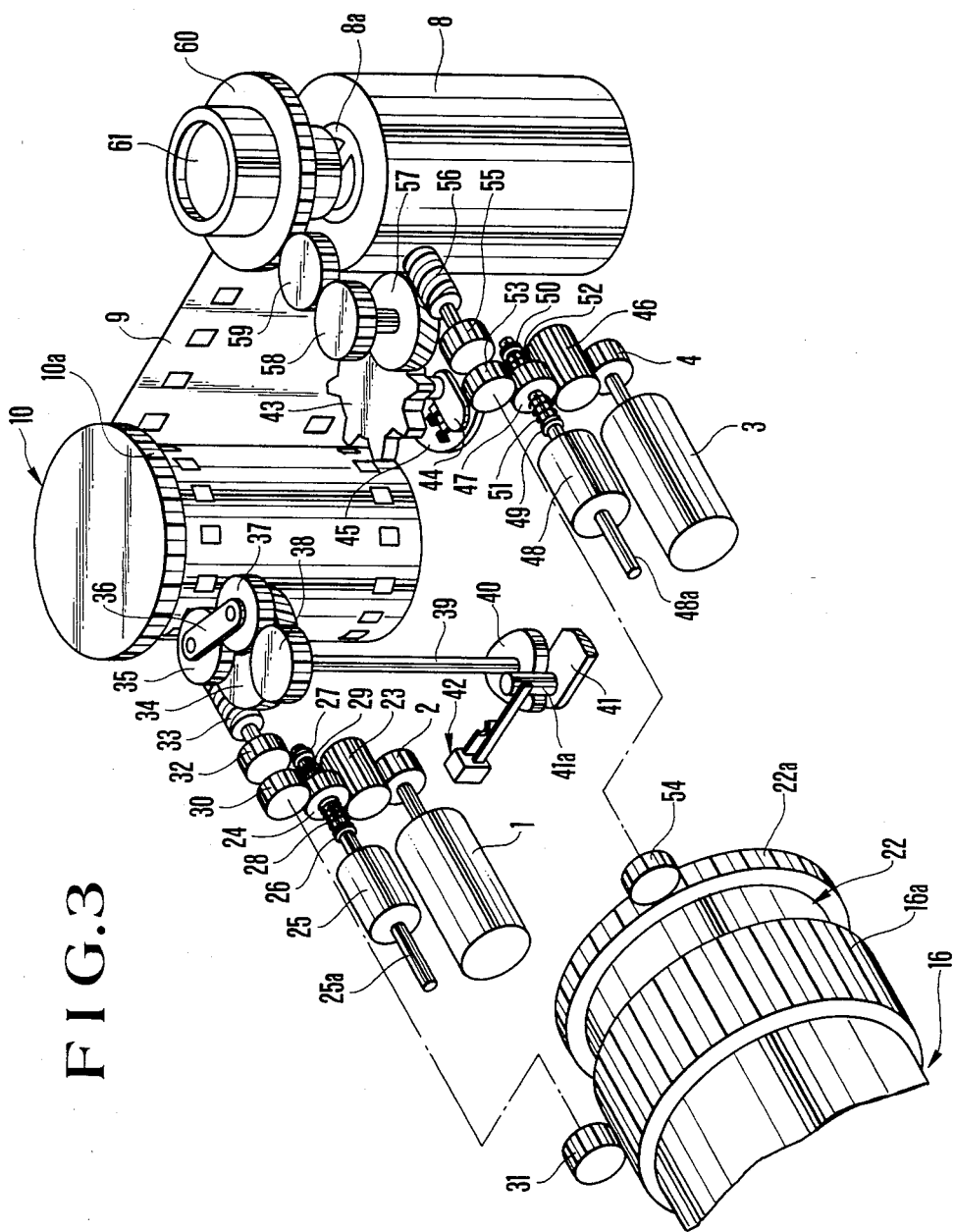
FIG. 3 is a perspective view showing the essential parts of the same embodiment as in a state of performing motor-driven focusing and zooming operations.

Referring to FIG. 3, a gear 2 which is disposed at the output shaft of the first motor 1 engages a changeover gear 24 via a gear 23. A plunger 25 is provided with a shaft 25a which is arranged to have its position variable between two positions in the direction of thrust. The shaft 25a has stoppers 26 and 27 thereto. The changeover gear 24 is carried by the shaft 25a and is interposed in between springs 28 and 29. The plunger 25 is arranged to be shiftable between two positions by means of a permanent magnet which is not shown. At the time of change-over between these two positions, when a coil which is not shown is energized, magnetic power on the attraction side is demagnetized and the shaft 25a is shifted toward the permanent magnet by the magnetic field of the coil within the stroke of changeover. The plunger is thus arranged to be of the known energy saving type having power supply to the coil cut off when it is attracted by the permanent magnet. This change-over operation of the plunger 25 enables the change-over gear 24 to be selectively shiftable to a gear 30 or to a gear 32. The output of the gear 30 is transmitted to a gear 31 via a transmission device which is not shown. The rotating force of the gear 31 then drives the gear part 16a of the focusing tube 16. Meanwhile, the output of the gear 32 is arranged to drive a worm wheel 34 which engages a worm 33 as the worm 33 rotates together with the gear 32. The worm wheel 34 is provided with a sun gear 35 which is arranged to coaxially rotate with the worm wheel 34. A planet gear 37 is carried by an arm 36 to be revolvable round the sun gear 35. The planet gear 37 selectably engages a gear 38 or the gear part 10a of the spool 10. When the sun gear 35 rotates clockwise as viewed on FIG. 3, the planet gear 37 engages the gear 38 to drive thereby a cam 40 via a transmission shaft 39. A charge, member 41 which is provided with a projection 41a for abutting engagement with the cam 40 moves rightward as viewed on the drawing to charge thereby the internal parts of the camera such as a shutter, etc. A charged state detecting switch 42 is arranged to be turned on by the projection 41a of the charge member 41 upon completion of a charging action of the member 41.

Further, when the sun gear 35 turns round counterclockwise as viewed, in FIG. 3, the planet gear 37 engages the gear part 10a of the spool 10 to cause the spool 10 to take up the film 9. A sprocket 43 engages the perforation of the film 9 and turns round as the film 9 moves. Then, a contact piece 44 which is coaxially arranged with the sprocket 43 slides over a pattern provided on a substrate 45 to detect the extent to which the film is moved. The sprocket 43 has eight teeth. One frame portion of the film is fed every time the sprocket makes one turn.

A gear 4 which is disposed at the output shaft of the second motor 3 disposed round the zoom lens barrel 7 is arranged to engage a change-over gear 47 via a gear 46. A plunger 48 is provided with a shaft 48a which is arranged to enable the plunger 48 to be shiftable between two positions in the direction of thrust. Stoppers 49 and 50 are secured to the shaft 48a. The above-stated change-over gear 47 is rotatably carried by the shaft 48a and is disposed in between springs 51 and 52. The plunger 48 is arranged to be electromagnetically operatable in the same manner as the above-stated plunger 25. The change-over gear 47 is arranged to be selectably engaged with a gear 53 or a gear 55 by the change-over action of the plunger 48. With the change-over gear 47 engaged with the gear 53, the gear 47 drives a gear 54 via a transmission device which is not shown. By this, a gear part 22a of the zoom tube 22 which engages the gear 54 is also driven. Further, with the change-over gear 47 engaged with the other gear 55, the gear 47 drives a worm wheel 57 via a worm 56 which is arranged to rotate together with the gear 55. Then, the rotation of the worm wheel 57 drives a film rewinding gear 60 via gears 58 and 59, the former being arranged to rotate in one body with the worm wheel 57. A driving force is thus transmitted via a transmission member 61 to the spool 8a of the film cartridge 8.

Figure 7:
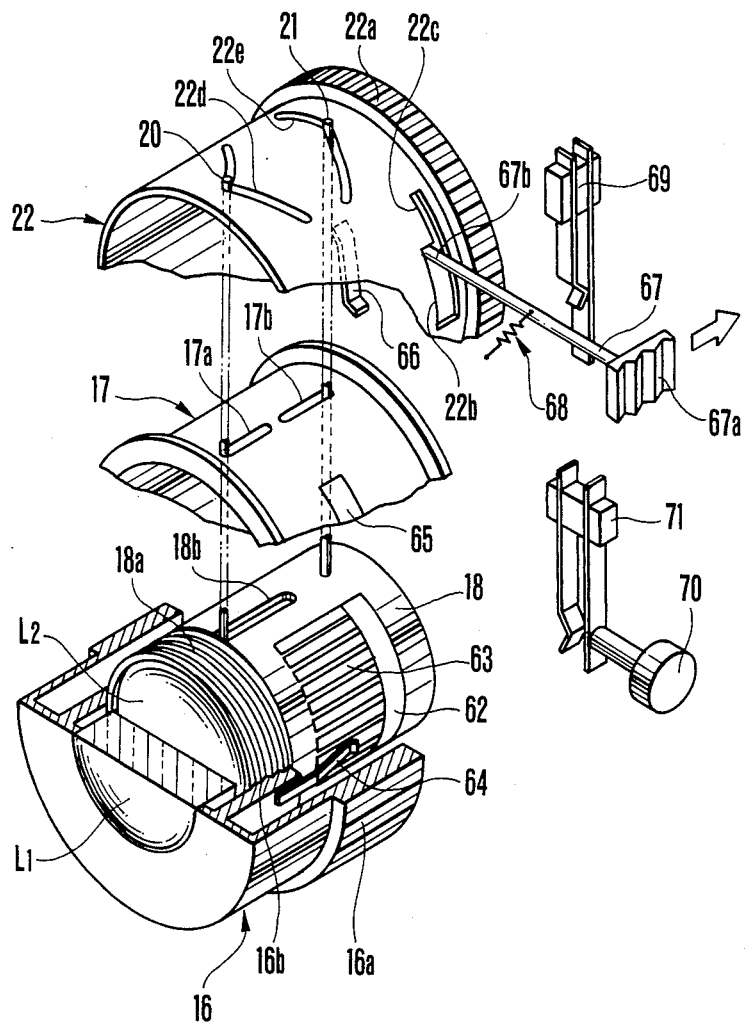
FIG. 7 is an exploded view showing the essential parts of a photo-taking lens driving device of the same embodiment.

FIG. 7 shows a photo-taking lens driving arrangement. The focusing tube 16 carries the first lens group L1 and has a helicoid thread 16b in its inner diametral part engage a helicoid thread 18a formed in the outer circumferential part of the carrying tube 18. A distance information resistance 62 is arranged to be generated jointly by a contact piece 64 which is provided on an inner tubular member fitted into a fixed tube 17 and an electrical conductive part 63 provided along the outer circumferential surface of the carrying tube 18 through their contact with each other. A distance signal is obtained from this resistance. The tube 16 moves toward the film or backward as it is turned round clockwise and moves forward as it is turned round counterclockwise. This movement of the tube 16 takes place relative to the carrying tube 18.

The zoom tube 22 is fitted on the outer circumference of the fixed tube 17. The positions of the lens groups are shifted toward a wide angle side as the zoom tube 22 turns clockwise and toward a telephoto side as the zoom tube 22 turns counterclockwise. Among these lens groups, the second lens group L2 is fitted in the carrying tube 18. A guide pin 20 which is secured to a carrying frame carrying the second lens group is arranged to engage a cam slot 22d of the zoom tube 22 via a straight slot 18b of the carrying tube 18 and a cam slot 17a of the fixed tube 17. A guide pin 21 which is secured to the outer circumference of the carrying tube 18 carrying the third lens group L3 engages a cam slot 22e of the zoom tube 22 via a cam slot 17b of the fixed tube 17. The fixed tube 17 is fixedly attached to the camera body which is not shown. A zooming information resistor 65 is formed on the outer circumference of the fixed tube 17. A zoom signal is produced by the contact of a contact piece 66 which is secured to the inner diametral surface of the zoom tube 22 when it comes into contact with the zoom information resistor 65.

When the zoom tube 22 is turned counterclockwise from its position shown in the drawing, the second lens group L2 moves backward, the third lens group forward and the first lens group also moves together with the third group. The fourth lens group L4 shown in FIG. 2 is secured to the camera body which is not shown and, therefore, is not shown in FIG. 7. An operation lever 67 is being urged to move forward in the direction of an optical axis by means of a spring 68. The lever 67 has an external operation knob 67a attached to one end thereof and has the other end abutting on a cut-out part 22b provided in the zoom tube 22 to define thereby a wide angle end part. When the external operation knob 67a is slid backward in the direction of arrow against the force of the spring 68, a switch 69 is turned off. Then, a control circuit which will be described later causes the zoom tube 22 to turn clockwise. The other end 67b of the lever 67 enters another cut-out part 22c of the zoom tube 22 to keep the switch 69 ib its OFF state. At the same time, the cam slots 22d and 22e serve to keep the carrying tube 18 in a position closest to the film surface on the wide angle side. Meanwhile, the second lens group L2 is also pulled toward the film surface. At the end of this process, the third lens group L3 and the second lens group L2 are in their closest possible positions to the film surface. This condition is detected by the contact piece 66. Then, the control circuit brings the driving operation to a stop. In a next step, the focusing tube 16 is turned clockwise to bring thereby the first lens group L1 also as close to the film surface as possible. This position of the first lens group L1 is detected by the contact piece 64. The control circuit then brings the driving operation to a stop.

The camera is provided with an operation button 70 for switching on the power supply of the camera. When the button 70 is pushed, a switch 71 turns on. Then, the control circuit switches the power supply on and keeps it on.

Figure 8:
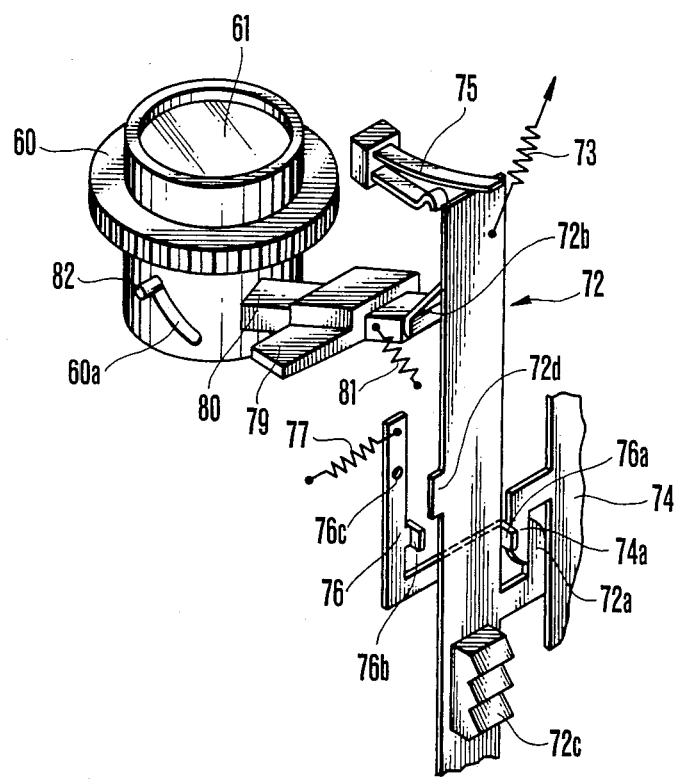
FIG. 8 is a perspective view showing the essential parts of a film rewinding device of the same embodiment.
Figure 9:
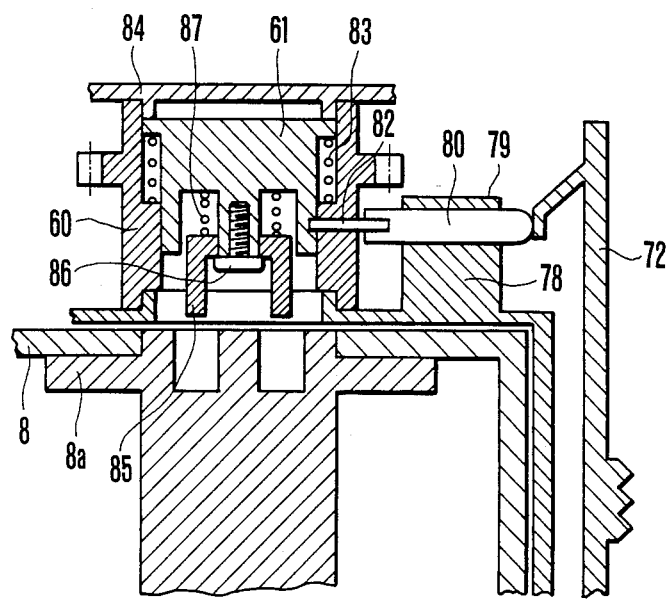
FIG. 9 is a section view showing the details of the same film rewinding device.

FIGS. 8 and 9 show the arrangement of a film rewinding device. A back lid lock member 72 is urged by a spring 73 to move upward. The member 72 is provided with a claw 72a which is arranged on one side of the member 72 to lock a back lid 74 in a closed state by engaging a lock claw 74a of the back lid 74 which is pivotally attached to the camera body. With the back lid thus locked, the switch 75 turns off to produce a film winding start signal which is supplied to the control circuit. Further, a cam part 72b of the back lid lock member 72 causes a back lid opening-and-closing detecting member 80 which is guided by a guide member 79 secured to a structural member of the camera to move to the left against the urging force of a spring 81 to permit the member 80 to enter the turning range of a detection pin 82 which serves as a rewinding fork rotation detecting member. The back lid lock member 72 has an operation part 72c which protrudes to the outside. When the operation part 72c is pushed down against the urging force of a spring 73, the lock claw 72a disengages from the lock claw 74a to permit the back lid 74 to be opened by turning it on a carrying shaft which is not shown. With the back lid 74 thus opened, the lock claw 74a of the lid retreats to free the fore end abutting part 76a of an L-shaped carrying lever 76. A spring 77 then causes the carrying lever 76 to turn counterclockwise on a shaft 76c. A bent carrying part 76b of the lever 76 engages a carrying part 72d provided on the other side of the back lid lock member 72. The member 72 is then kept against the urging force of the spring 73 in its back lid opening position. With the back lid lock member 72 in the back lid opening position, a switch 75 turns on. The detecting member 80 is caused by the spring 81 to be guided by the guide member 79 to move to the right away from the turning range of the above-stated detecting pin 82.

When the back lid 74 is again closed, the abutting engagement between the lock claw 74a of the lid 74 and the fore end abutting part 76a of the carrying lever 76 causes the lever 76 to turn clockwise against the urging force of the spring 77. The back lid lock member 72 is thus released from the holding position thereof and the spring 73 causes it to ascend back into a black lid locking state as shown in FIG. 8. The cam part 72b of the member 72 causes the detecting member 80 to move leftward into the turning range of the detecting pin 82.

The above-stated rewinding gear 60 is provided with a tubular body part. A rewinding transmission member 61 is fitted into the tubular body part of the gear 60. The transmission member 61 is provided with a detecting pin 82 which is secured to the member 61 and is arranged to engage a cam slot 60a formed in the tubular body part. The member 61 is urged upward by a spring 83. However, the upward move of the member 61 is restricted by a restricting member 84 which is mounted on the upper end surface of the rewinding gear 60. The lower end part of the member 61 engages a rewinding fork 85 which is arranged to rotate together with the member 61. The rewinding fork 85 is slidably inserted in the lower part of the member 61 and is slidable up and down and is prevented from pulling out by a screw 86 while a spring 87 urges the fork to move downward.

With a film cartridge 8 loaded as shown in FIG. 9, winding up the film, the rewinding fork 85 is moved upward by the spring 83 together with the rewinding transmission member 61. The fork 85 thus does not engage the spool 8a of the cartridge 8 in that instance. However, when the rewinding gear 60 is rotated clockwise by the motor 3 for the purpose of rewinding the film, the detecting pin 82 rotates together with the rewinding transmission member 61 and thus comes to abut on the back lid opening/closing detection member 80 to have its rotation restricted thereby. Then, the pin 82 moves downward along the cam slot 60a against the force of the spring 83. During this downward moving process, when the detecting pin 82 comes out of the abutting range on the detecting member 80, the rewinding fork 85 comes to engage the spool 8a of the film cartridge 8. In the event of phase discrepancy in this engaging process, any stroke is absorbed by means of the spring 87. With the rewinding fork 85 thus coming to engage the spool 8a, even if the detecting pin 82 moves lower than its abutting position on the detecting member 80, the film rewinding load causes the detecting pin 82 to further move downward along the cam slot 60a to the lowest end thereof, so that film rewinding can be stably accomplished. When the whole film is taken up on the cartridge 8, the film rewinding driving action of the motor 3 comes to a stop and the film rewinding operation comes to an end.

Then, since the film rewinding load disappears, the urging force of the spring 83 causes the rewinding fork 85 to move upward together with the rewinding transmission member 61. Then, since either the fork 85 thus disengaged from the spool 8a or the back lid 74 is opened by pushing the back lid lock member 72, the back lid opening/closing detecting member 80 is retracted by the force of the spring 81, so that the cartridge 8 can be taken out with ease. Further, since the back lid opening/closing detection member 80 is thus retracted with the back lid 74 opened, the rewinding fork 85 never comes down even if the rewinding gear 60 happens to rotate clockwise.

If, under this condition, a new film cartridge is loaded, the back lid 74 is closed and the back lid lock member 72 is locked, the back lid opening/closing detection member 80 moves into the turning range of the detecting pin 82 against the force of the spring 81. However, since its forward and backward movement is limited by the guide member 79, when it comes to abut on the detecting pin 82, it causes the pin 82 in the direction of causing the rewinding gear 60 to rotate clockwise. By virtue of this arrangement, the rewinding fork 85 is effectively prevented from engaging the spool 8a of the cartridge 8 during the process of closing the back lid 74.

When the cartridge 8 is loaded under the condition shown in FIG. 3 and the back lid 74 is closed as shown in FIG. 8, the carrying lever 76 turns counterclockwise; the spring 73 causes the back lid lock member 72 to slide upward; the switch 75 shifts from an ON state to an OFF state; and the cam part 72b causes the detecting member 80 to slide leftward against the force of the spring 81.

Figure 4:
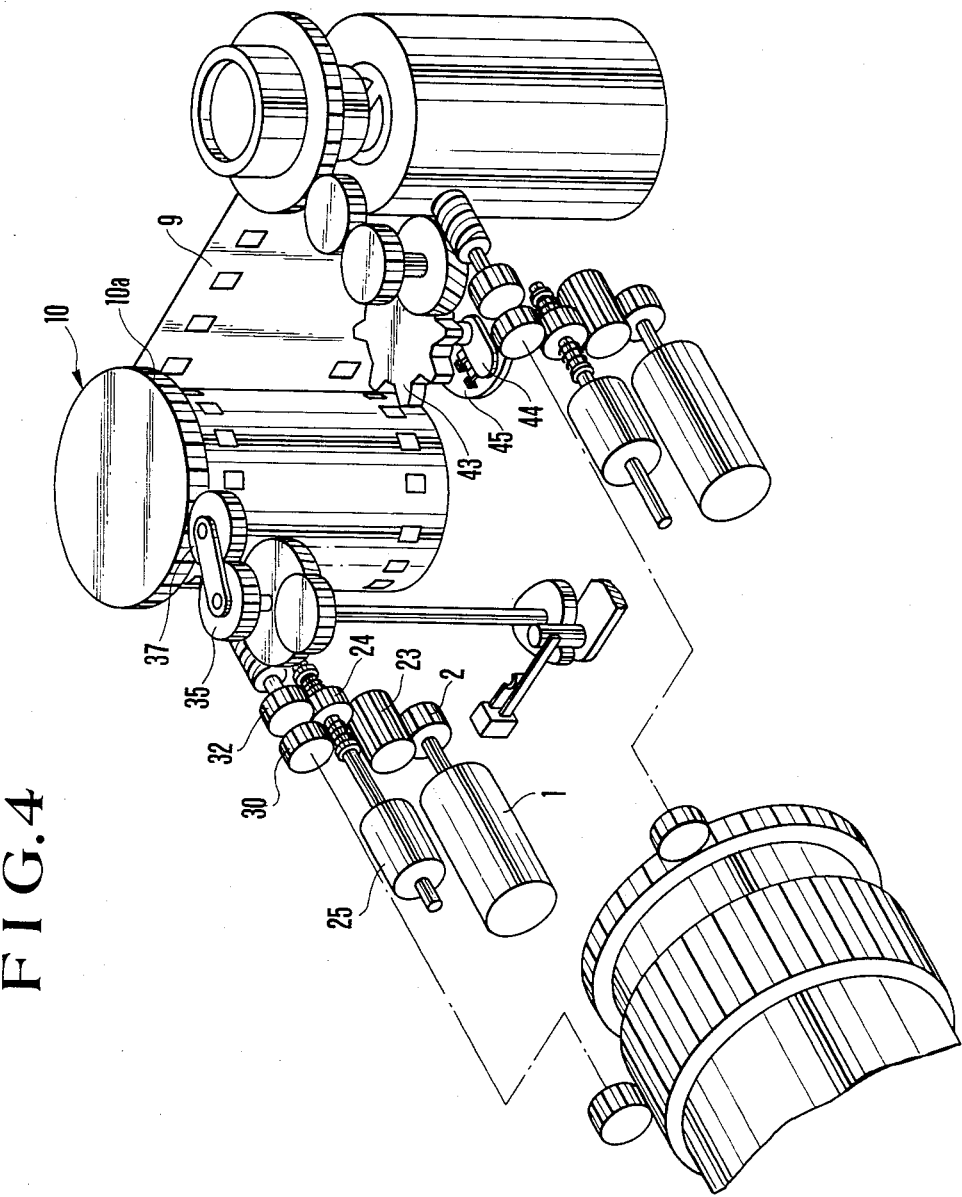
FIG. 4 is a perspective view showing the essential parts of the same embodiment as in a state of performing a film winding operation.

A signal representing the OFF state of the switch 75 actuates the control circuit which is not shown. The power is applied to the plunger 25. The changeover gear 24 slides to disengage the gear 30 and engage the gear 32. Following this, the power is applied to the first motor 1 in the direction of causing the sun gear 35 to turn counterclockwise. Here, the power supply to the motor 1 in the direction in which the sun gear turns counterclockwise is called the forward direction power supply to the motor 1 and power supply in another direction in which the sun gear turns clockwise the reverse direction power supply. The forward rotation of the sun gear 35 causes the planet gear 37 to revolve counterclockwise. The gear 37 comes to engage the gear part 10a of the spool 10 to cause the spool 10 to rotate counterclockwise. In response to this, an automatic film loading device which is not shown begins to wind the film 9. FIG. 4 shows the film winding arrangement.

Under this condition, the perforation of the film 9 causes the sprocket 43 to rotate counterclockwise. The contact piece 44 which turns together with the sprocket 43 comes into contact with the pattern provided on the substrate 45. A predetermined signal produced by this contact permits detection of an extent to which the film is fed. When the film feeding extent reaches the predetermined extent, the power supply to the motor 1 is turned off by the above-stated control circuit. The film winding operation then comes to a stop. At the same time, the power is applied to the plunger 25 to disengage the gear 24 from the gear 32 and to engage it with the other gear 30. Preparation for photographing is completed by this process.

Following this, when a zoom operation switch which is not shown is operated to select a telephoto side or a wide angle side of the lens, the power is applied via the control circuit to the second motor 3. Then, the motor causes the zoom tube 22 to be turned round via the gears 4, 46, 47, 53 and 54. A desired focal length is thus obtained while observing an images picked up through the half-mirror 14, the pentagonal prism 11 and the eyepiece 13.

A shutter release operation switch which is not shown is arranged to be operated in two stepwise strokes. At the first stroke of operation, an infrared ray flux is projected via the photo-taking optical system on an object to be photographed. A reflection light flux thus obtained from the object is received by the distance measuring light receiving part 6 shown in FIG. 1. An automatic focusing operation then begins. The focusing state is detected by the control circuit which is arranged in a known manner though it is not shown. The first motor 1 is driven in a desired direction. The focusing tube 16 is turned round via the gears 2, 23, 24, 30 and 31 to set the optical system in an in-focus position.

When the release operation switch is pushed to the second stroke, the stop 19 is driven to shift its position to a desired aperture value position according to a signal produced from the control circuit. The shutter 15 is operated. Upon completion of the shutter operation, the aperture position of the step 19 is brought back to a full open position. The stop 19 is driven by a driving device arranged to operate according to a known electromagnetic driving method. The shutter 15 is mechanically charged via the charge member 41. A leading shutter curtain controlling magnet and a trailing shutter curtain controlling magnet are arranged to be operated by signals from the control circuit which is not shown.

Figure 5:
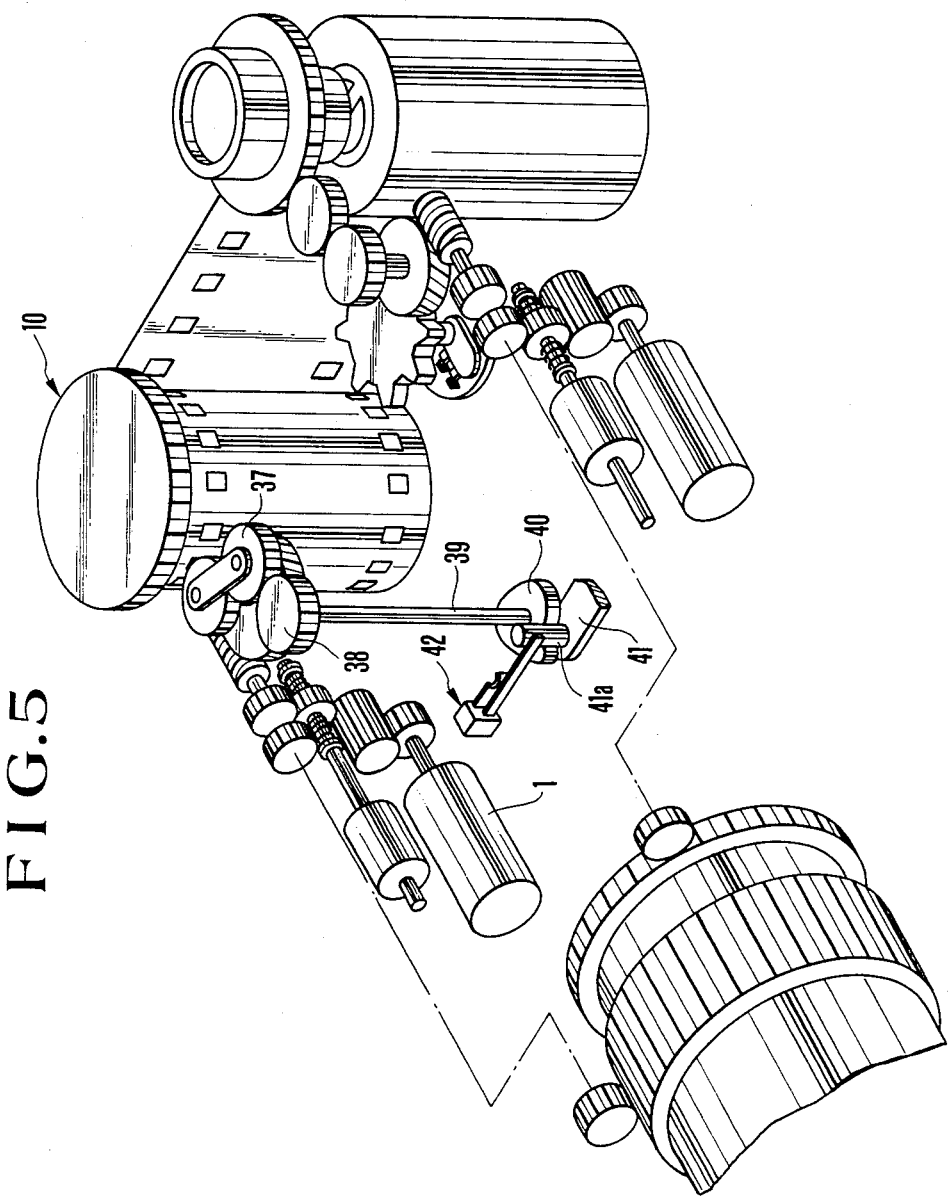
FIG. 5 is a perspective view showing the essential parts of the same embodiment as in a state of charging the internal devices thereof.

Upon completion of the operation of the shutter 15, the control circuit applies the power to the plunger 25. The gear 24 is disengaged from the gear 30 and engaged with the other gear 32. Following that, the power is applied to the motor 1 in the forward direction to carry out again film winding in a state as shown in FIG. 4. When feeding the film 9 to an extent of one frame portion thereof is detected through a signal produced by the contact of the contact piece 44 with the pattern provided on the substrate 45, the power supply to the motor 1 in the forward direction is turned off and a power supply in the reverse direction begins. As a result, the rotation of the sun gear 35 changes to clockwise rotation. The planet gear 37 revolves clockwise to come to engage the gear 38. There obtains the charged state of the camera as shown in FIG. 5.

The cam 40 then turns round clockwise to actuate the charge member 41. The shutter 15 is charged by this. During this process of charging, the switch 42 first shifts from an ON state to an OFF state. A signal thus produced is ignored. Then, a change of this switch from the OFF state to the ON state which takes place upon completion of the charging process is detected. The control circuit then brings the power supply to the motor 1 in the reverse direction to a stop. The power is applied to the plunger 25. The gear 24 disengages the gear 32 and engages the gear 30. The embodiment then comes back to the state as shown in FIG. 3.

A sequence of operations including the photographing operation for the first frame and the preparation for photographing on a second frame comes to an end with the camera coming back to the state of FIG. 3. Following this, the processes of operation mentioned in the foregoing are repeated for photographing. With the number of photographed frames thus having increased, when the film 9 comes to its end, there obtains a stretched state. The film is then no longer fed. The signal which has been produced jointly by the moving contact piece 44 and the pattern of the substrate 45 is no longer produced. A timer circuit which is included in the known control circuit causes a film rewinding action to begin.

Figure 6:
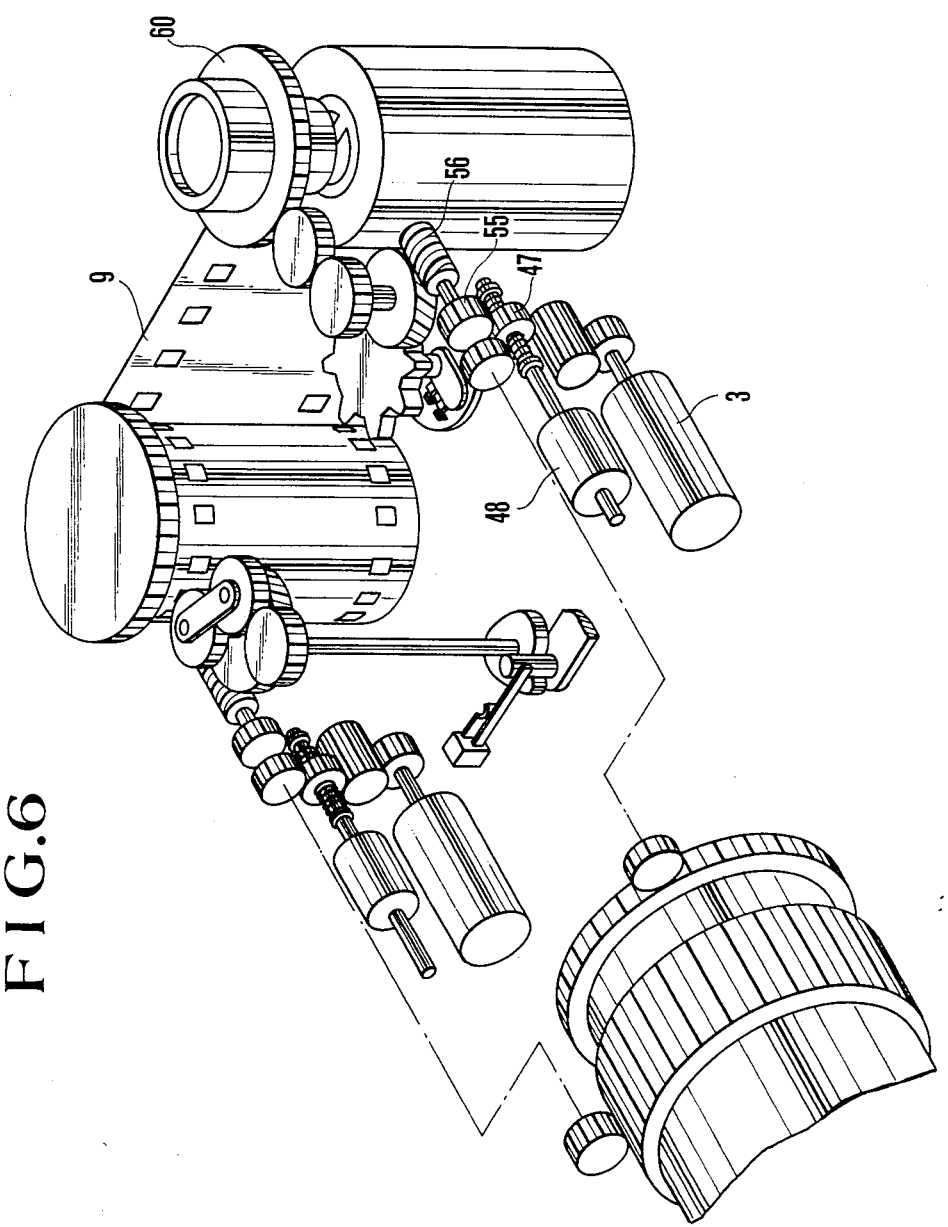
FIG. 6 is a perspective view showing the essential parts of the same embodiment as in a state of performing a film rewinding operation.

First, the power supply to the motor 1 in the forward direction is turned off and the power is this time applied to the motor in the reverse direction. As a result, the sun gear 35 rotates clockwise to bring the planet gear 37 into engagement with the gear 38. This causes the cam 40 to turn round clockwise. The switch 42 shifts from the OFF state to the ON state. The power supply to the motor 1 in the reverse direction then comes to a stop. Next, the power is applied to the plunger 25. The gear 24 disengages the gear 32 and comes to engage the gear 30. At the same time, the power is applied to the plunger 48. The gear 47 disengages the gear 53 and engages the gear 55. The power is applied to the motor 3 in the direction of causing the film rewinding gear 60 to rotate clockwise. The film 9 begins to be taken up back into the cartridge 8 under the film rewinding condition as shown in FIG. 6.

Under the film rewinding condition, the sprocket 43 rotates clockwise. The moving contact piece 44 and the pattern of the substrate 45 jointly produce a signal in the same manner as in the case of film winding. With the film thus rewound, when the fore end of the film 9 comes to disengage the teeth of the sprocket 43, the sprocket 43 no longer rotates. Therefore, the signal produced by the contact between the contact piece 44 and the substrate 45 ceases to be produced. Then, the timer circuit included in the control circuit operates to bring the power supply to the motor 3 to a stop. Following this, the power is applied to the plunger 48. The gear 47 disengages the gear 55 and engages the gear 53. The film rewinding action thus comes to an end. There obtains the condition which is the same as the condition shown in FIG. 3 with the exception of that the film 9 is completely taken up inside of the cartridge 8.

Again referring to FIG. 8, when the back lid lock member 72 is pushed down to open the back lid 74, the detecting member 80 which has been pushed by the cam part 72b of the lock member 72 is retracted by the force of the spring 81. This allows the rewinding transmission member 61 to ascend to reliably disengage the fork 85 from the spool 8a of the cartridge 8, so that the cartridge 8 can be readily taken out.

Figure 10:
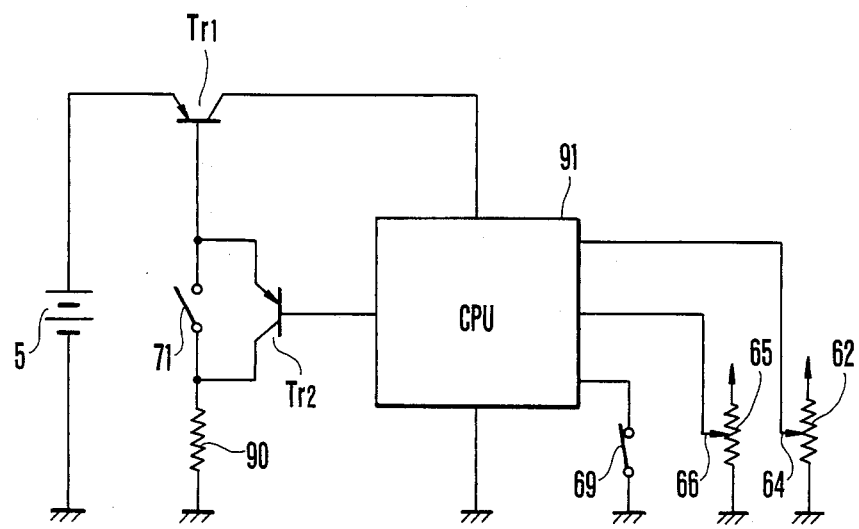
FIG. 10 is a circuit diagram showing a power supply circuit for operating the camera.

The power supply actuating operation lever 67 and the operation button 70 are arranged to operate as follows: First, the power supply circuit is arranged as shown in FIG. 10. Referring to FIG. 10, the positive pole of the battery 5 is connected to the emitter of a transistor Tr1. The collector of the transistor Tr1 is connected to a central processing unit 91 (hereinafter referred to as the CPU 91). The base of the transistor is grounded via a switch 71 and a resistor 90. A transistor Tr2 is parallel connected to the switch 71. The base of the transistor Tr2 is connected to the CPU 91. Further, to the CPU 91 are connected the sliding contact piece 64 of a distance information resistor 62, the sliding contact piece 66 of a zoom information resistor 65 and a switch 69.

To turn on the power supply, the switch 71 is turned on. Then, the transistor Tr1 turns on to cause the other transistor Tr2 to turn on via the CPU 91. Under this condition, the power supply is kept on even if the switch 71 is turned off.

Meanwhile, when the switch 69 is turned on, the zoom tube 22 and the focusing tube 16 are driven by the predetermined operation via the CPU 91. The driving operation comes to a stop when the lens is brought to its shortest length and then the power supply is automatically turned off.

Figure 11:
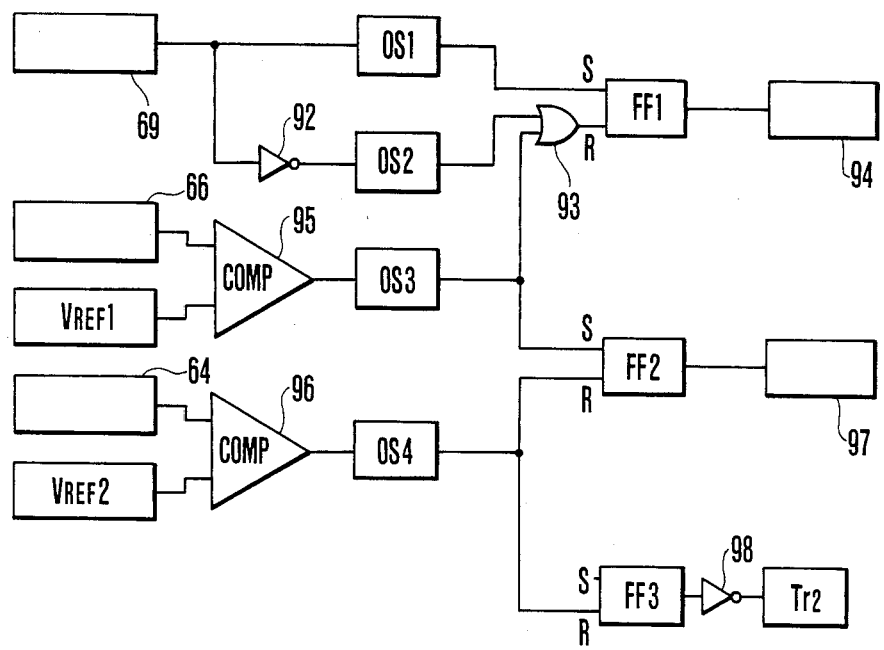
FIG. 11 is a diagram schematically showing the flow of operation which takes place within a control circuit when the power supply is switched off.

FIG. 11 schematically shows the flow of operation performed within the CPU 91 when the power supply is turned off. The switch 69 is connected to a one-shot circuit OS1 and also to a one-shot circuit OS2 via an inverter 92. The output of the one-shot circuit OS1 is arranged to be supplied to the set terminal S of a flip-flop FF1 while that of the one-shot circuit OS2 to be supplied via an OR circuit 93 to the reset terminal R of the flip-flop FF1. The output of the flip-flop FF1 is arranged to be supplied to a power supply control circuit 94 for the second motor 3.

The sliding contact piece 66 is connected to a comparator 95 together with a reference input VREF1 which is provided for detecting the position of the zoom tube 22 at which a stowing action on the zoom tube 22 is to be stopped. The output terminal of the comparator 95 is connected to a one-shot circuit OS3. The output of the one-shot circuit OS3 is arranged to be supplied to one of the input terminals of the above-stated OR circuit 93 and also to the set terminal S of a flip-flop FF2. The output of the flip-flop FF2 is arranged to be supplied to a power supply control circuit 97 provided for the first motor 1.

The sliding contact piece 64 is connected to a comparator 96 together with a reference input VREF2 which is for detection of the stowing stop position of the focusing tube 16. The output terminal of the comparator 96 is connected to a one-shot circuit OS4. The output of the one-shot circuit OS4 is arranged to be supplied to the reset terminal R of the flip-flop FF2 and also to the reset terminal R of a flip-flop FF3. The output terminal of the flip-flop FF3 is connected via an inverter 98 to the transistor Tr2.

In turning off the power supply, the operation knob 67a of the operation lever 67 is moved in the direction of arrow against the force of the spring 68. Then, the switch 69 is turned off by one end of the lever 67. The other end of the lever 67 disengages the end edge of the cut-out part 22b of the zoom tube 22. The switch 69 is in an OFF state and produces a high level output to actuate the one-shot circuit OS1. The flip-flop FF1 is set. Then, the output of the flip-flop FF1 actuates the control circuit 94 which applies the power to the motor 3 to cause the zoom tube 22 to turn clockwise. The power supply in this direction is called the reverse direction power supply. Under the condition as shown in FIG. 7, the zoom tube 22 is in a wide-angle end position. In case that the zoom tube 22 is in a position on the telephoto side, the operation knob 67a must be kept by hand in the state of having moved in the direction of arrow until the zoom tube 22 passes over the wide angle end. If the hand is detached from the knob before that, the one-shot circuit OS2 is operated via the inverter 92. In that event, the flip-flop FF1 is reset via the OR circuit 93 and the power supply to the motor 3 comes to a stop. In that event, if the operation knob 67a is again operated by hand, the power supply to the motor 3 is resumed through the operation described above.

While the zoom tube 22 is turning round clockwise, the zooming information resistance 65 is obtained from the contact piece 66 to detect an absolute zooming position. The output of the contact piece 65 which is thus obtained is compared by the comparator 95 with the reference input VREF1 which is provided for detecting the stowing stop position of the zoom tube 22. Upon detection of the stop position, the one-shot circuit OS3 is actuated. The flip-flop FF1 is reset via the OR circuit 93 and the power supply to the motor 3 is brought to a stop. At the same time, another flip-flop FF2 is set to actuate the control circuit 97 for applying the power to the motor 1 in the direction of causing the focusing tube 16 to turn clockwise. Then, the first lens group L1 comes closer to the film 9. Hereinafter this power applying direction is called the reverse power supply direction. During the clockwise turning movement of the focusing tube 16, the distance information resistance 62 is obtained from the contact piece 64 and an absolute distance position is detected. The output of the contact piece 64 which is thus obtained is compared by the comparator 96 with the reference input VREF2 which is provided for detecting the stowing stop position of the focusing tube 16. Upon detection of the stowing stop position, the comparator 96 produces a high level signal. In response to this signal, the one-shot circuit OS4 operates to reset the flip-flop FF2. The reverse direction power supply to the motor 1 then comes to a stop. At the same time, the flip-flop FF3 is reset. The transistor Tr2 is turned off via the inverter 98 and the transistor Tr1 which is for holding the power supply is also turned off.

This brings the power supply turning-off action to an end. Under this condition, the first, second and third lens groups L1, L2 and L3 are positioned most closely to the film 9 respectively. This lens stowing arrangement greatly contributes to reduction in size of the camera.

As mentioned in the foregoing, the zoom tube 22 and the focusing tube 16 are arranged to be driven at a certain time interval. This arrangement is made for the purpose of preventing interference between the first and second lens groups L1 and L2.

Figure 12:
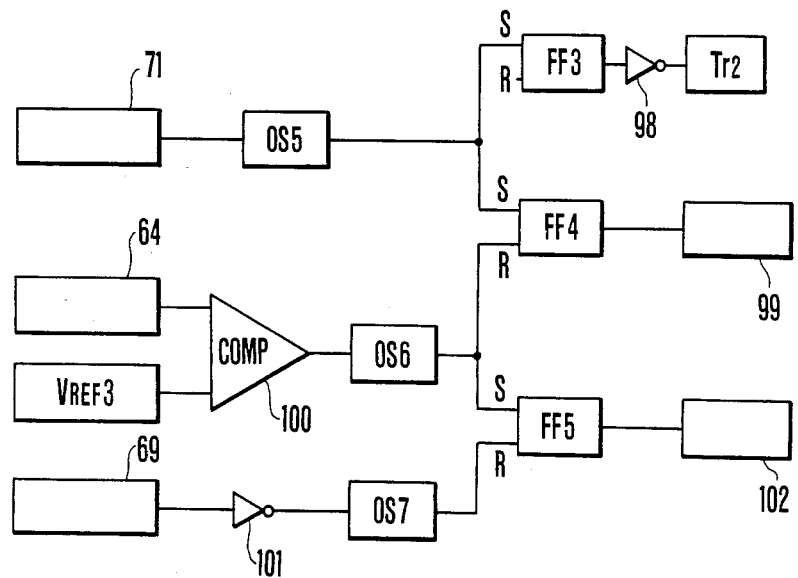

When the power supply is turned on from the OFF state thereof, the embodiment operates as follows: FIG. 12 shows the flow of operation performed within the CPU 91 when the power supply is turned on. The switch 71 is connected to the set terminals S of the flip-flop FF3 and FF4 respectively via a one-shot circuit OS5. The output terminal of the flip-flop FF4 is connected to a control circuit 99 which is arranged to control the forward direction power supply to the motor 1. The sliding contact piece 64 is connected to a comparator 100 together with a reference input VREF3 which is provided for detecting the infinity distance and position of the focusing tube. The output terminal of the comparator 100 is connected to a one-shot circuit OS6. The output terminal of the one-shot circuit OS6 is connected respectively to the reset terminal R of the flip-flop FF4 and to the set terminal S of a flip-flop FF5. The output terminal of the flip-flop FF5 is connected to a control circuit 102 which is arranged to control the forward direction power supply to the second motor 3. The switch 69 is connected via an inverter 101 to a one-shot circuit OS7. The output terminal of the one-shot circuit OS7 is connected to the reset terminal R of the flip-flop FF5. When the operation button 70 is pushed, the switch 71 turns on. At the same time, the transistor Tr1 turns on to set thereby the flip-flop FF3 through the one-shot circuit OS5 disposed within the CPU 91. Then, the transistor Tr2 is turned on via an inverter 98 to keep the transistor Tr1 in its ON state. Under this condition, even if the switch 71 is turned on, the power supply remains on to allow the ensuing sequence of operation to be continuously performed in the following manner: The output of the one-shot circuit OS5 sets the flip-flop FF4 to actuate the control circuit 99 for controlling the forward direction power supply to the motor 1. The focusing tube 16 turns counterclockwise. Then the first lens group L1 shifts forward toward the object to be photographed. When the comparator 100 detects that the distance information input from the sliding contact piece 64 has become equal to the reference input VREF3 which is provided for detecting the infinity distance end position, the flip-flop FF4 is reset via the one-shot circuit OS6. As a result, the forward direction power supply to the motor 1 comes to a stop. At the same time the flip-flop FF5 is set. Then, the control circuit 102 for controlling the forward direction power supply to the motor 3 is rendered operative. The motor 3 then turns the zoom tube 22 counterclockwise. When the other end 67b of the operation lever 67 comes out of the restricting range of the cut-out part 22c and reaches another cut-out part 22b, of the zoom tube 22, the force of the spring 68 moves the lever back to the left to turn on the switch 69 thereby. As a result, the output level of the switch becomes low. Therefore, the output of the switch 69 comes via an inverter 101 to set the one-shot circuit OS7 and reset the flip-flop FF5. This renders operative the control circuit 102 for controlling the forward direction power supply to the motor 3. The power supply to the motor 3 comes to a stop. By this, preparation for photographing after turning on of the power supply is completed. The position of the zoom tube 22 is then in its wide-angle end position while the focusing tube 16 is in its infinity distance end position as shown in FIG. 7.

As apparent from the foregoing description, the camera according to this invention is arranged to have the photo-taking lens automatically stowed by a simple operation on an external operation switch when the camera is not in use in such a way as to keep it in a stowed state of having such a minimal lens length that is impossible for photographing, so that the camera can be carried in a compact size. The invention, therefore, has an advantage in terms of portability.

What is claimed is:

1. A single-lens reflex camera having a lens barrel with a taking lens, comprising:
   (a) a first mechanism arranged to adjust the focusing state of said taking lens;
   (b) a second mechanism arranged to adjust the focal length of said taking lens;
   (c) a first motor secured to said taking lens and arranged to move said first mechanism;
   (d) a second motor secured to said taking lens and arranged to move said second mechanism;
   (e) operating means for effecting a manual operation;
   (f) switching means responsive to said operating means;
   (g) motor control means for driving, in response to the state of said switching means, said first and second mechanisms to shift their positions to predetermined positions where the taking lens has the shortest length thereof;
   (h) energy supply control means operably connected to said motors to interrupt an electrical energy supply path to said first and second motors in response to said first and second mechanisms reaching the predetermined positions;
   (i) a power source for supplying electrical power to said motor control means, said power source and said first and second motor being arranged around said lens barrel and in parallel to an optical axis of the taking lens.

2. A camera according to claim 1, wherein said energy supply control means includes a transistor connected to said power source.

3. A camera according to claim 1, wherein said motor control means is arranged to drive, in response to the state of said switching means, said second motor until the position of said taking lens reaches the wide-angle end position thereof and, after that, to drive said first motor until the position of said taking lens reaches the infinity distance end position thereof.

4. A single-lens reflex camera having a lens barrel with a taking lens, comprising:
   (a) a first mechanism arranged to adjust the focusing state of said taking lens,
   (b) a first motor secured to said taking lens and arranged to move said first mechanism;
   (c) operating means for effecting a manual operation;
   (d) switching means responsive to said operating means;
   (e) motor control means connected to said first motor for driving said first motor in response to the state of said switching means to move said first mechanism up to a position thereof where said taking lens comes to have the shortest length thereof;
   (f) energy supply control means operatively connected to said first motor to interrupt an electrical energy supply path to said first motor in response to said first mechanism reaching the position; and
   (g) a power source for supplying electrical power to said motor control means, said power source and said first motor being arranged around said lens barrel and in parallel to an optical axis of the taking lens.

5. A camera having a lens barrel with a taking lens, comprising:
   (a) a first mechanism arranged to adjust the focusing state of said taking lens;
   (b) a first motor secured to said taking lens and arranged to move said first mechanism;
   (c) operating means for effecting a manual operation;
   (d) switching means responsive to said operating means;
   (e) motor control means connected to said first motor for driving said first motor in response to the state of said switching means to move said first mechanism up to a position thereof where said taking lens comes to have the shortest length thereof;

(f) energy supply means operatively connected to said first motor to interrupt an electrical energy path to said first motor when said first mechanism reaches the position; and (g) a power source for supplying electrical power to said motor control means said power source and said first motor being arranged around said lens barrel and in parallel to an optical axis of the taking lens.

* * * * *

UNITED STATES PATENT AND TRADEMARK OFFICE
CERTIFICATE OF CORRECTION

PATENT NO. : 4,827,296

DATED : May 2, 1989

INVENTOR(S) : Shosuke Haraguchi, et al.

It is certified that error appears in the above-identified patent and that said Letters Patent is hereby corrected as shown below:

Title page:

AT [56] References Cited:

Change "4,643,555  2/1987  Wakayashi" to read --4,643,555  2/1987  Wakabayashi--.

COLUMN 1:

Line 8, change "the." to --the--.

Line 13, delete "the".

Line 14, change "of-the-" to --of the--.

Line 22, delete "the sizes of".

COLUMN 2:

Line 17, change "Round" to --Around--.

UNITED STATES PATENT AND TRADEMARK OFFICE
CERTIFICATE OF CORRECTION

PATENT NO. : 4,827,296

DATED : May 2, 1989

INVENTOR(S) : Shosuke Haraguchi, et al.

It is certified that error appears in the above-identified patent and that said Letters Patent is hereby corrected as shown below:

COLUMN 3:

Lines 6 and 10, change "on" to --in--.

Line 8, change "charge," to --charge--.

Line 58, change "information resistance 62" to --information resistor 62--.

COLUMN 4:

Line 40, change "ib" to --in--.

COLUMN 5:

Line 34, change "black" to --back--.

COLUMN 7:

Line 39, change "step 19" to --stop 19--.

UNITED STATES PATENT AND TRADEMARK OFFICE
CERTIFICATE OF CORRECTION

PATENT NO. : 4,827,296            Page 3 of 4

DATED : May 2, 1989

INVENTOR(S) : Shosuke Haraguchi, et al.

It is certified that error appears in the above-identified patent and that said Letters Patent is hereby corrected as shown below:

COLUMN 8:

Line 53, delete "of".

COLUMN 10:

Line 11, delete "round".

COLUMN 11:

Line 17, change "operation" to --operations--.

COLUMN 12:

Line 18, change "said first and second motor" to --said first and second motors--.

Line 35, change "(b)a" to --(b) a--.

UNITED STATES PATENT AND TRADEMARK OFFICE
CERTIFICATE OF CORRECTION

PATENT NO.   :   4,827,296

DATED        :   May 2, 1989

INVENTOR(S)  :   Shosuke Haraguchi, et al.

It is certified that error appears in the above-identified patent and that said Letters Patent is hereby corrected as shown below:

COLUMN 14:

Line 1, change "means said" to --means, said--.

Signed and Sealed this

Fifteenth Day of May, 1990

Attest:

HARRY F. MANBECK, JR.

Attesting Officer

Commissioner of Patents and Trademarks